United States Patent
Chen et al.

(10) Patent No.: US 9,528,170 B2
(45) Date of Patent: Dec. 27, 2016

(54) METHOD FOR PRODUCING A HIGH-PURITY NANOMETER ZINC OXIDE FROM STEEL PLANT SMOKE AND DUST BY AMMONIA DECARBURIZATION

(71) Applicant: SICHUAN XINHONG TECHNOLOGY CO., LTD, Chengdu, Sichuan (CN)

(72) Inventors: Shangquan Chen, Chengdu (CN); Shichun Li, Chengdu (CN); Xiaohong Li, Chengdu (CN)

(73) Assignee: SICHUAN XINHONG TECHNOLOGY CO., LTD, Chengdu (CN)

( * ) Notice: Subject to any disclaimer, the term of this patent is extended or adjusted under 35 U.S.C. 154(b) by 46 days.

(21) Appl. No.: 14/430,549

(22) PCT Filed: Sep. 25, 2012

(86) PCT No.: PCT/CN2012/081877
§ 371 (c)(1),
(2) Date: Mar. 23, 2015

(87) PCT Pub. No.: WO2014/047764
PCT Pub. Date: Apr. 3, 2014

(65) Prior Publication Data
US 2015/0252446 A1    Sep. 10, 2015

(51) Int. Cl.
C22B 19/34    (2006.01)
B82Y 40/00    (2011.01)
C01G 9/02     (2006.01)
C22B 7/02     (2006.01)
C22B 3/00     (2006.01)
C22B 19/30    (2006.01)

(52) U.S. Cl.
CPC ............... *C22B 19/34* (2013.01); *B82Y 40/00* (2013.01); *C01G 9/02* (2013.01); *C22B 7/02* (2013.01); *C22B 19/24* (2013.01); *C22B 19/30* (2013.01); *C01P 2004/64* (2013.01); *C01P 2006/12* (2013.01); *C01P 2006/80* (2013.01); *Y02P 10/234* (2015.11)

(58) Field of Classification Search
CPC .... C01G 9/02; C01P 2006/12; C01P 2006/80; B82Y 40/00
See application file for complete search history.

(56) References Cited

FOREIGN PATENT DOCUMENTS

| CN | 1065685 A   | 10/1992 |
| CN | 1986421 A   | 6/2007  |
| CN | 102168190 A | 8/2011  |
| CN | 102515252 A | 6/2012  |

OTHER PUBLICATIONS

Wang, Weisong et al., Current Applications and Further Development of Surfactants in Dispersion System, China High-tech Enterprises, Dec. 31, 2010, pp. 189-190, Issue 24.

*Primary Examiner* — Richard M Rump

(57) ABSTRACT

Disclosed is a method for producing a high-purity nanometer zinc oxide from steel plant smoke and dust by ammonia decarburization. The method comprises: leaching with an ammonia water-ammonium carbonate solution as a leaching agent, adding 0.3-0.5 kg of sodium fluorosilicate to per cubic meter of the leaching agent to obtain a leaching solution, then adding 50-60 kg slaked lime to per cubic meter of the leached solution to carry out decarburization with heating, and carrying out purification and impurity removal and then refining treatment. According to the method, the ammonia process is used for treating smoke and dust, and the existing ammonia process is adaptively improved, the leaching speed and the leaching rate of zinc in the smoke and dust are improved, and the zinc oxide with the purity of more than 99.7% can be obtained; the treatment method of the present invention is characterized by low energy consumption and high efficiency, the leaching agent can be recycled, and thoroughly solves the problem of zinc load of steel plant furnace smoke and dust, thereby meeting the requirement of the steel plant on purification of the harmful components comprising zinc and alkali metals and achieving good production circulation.

9 Claims, No Drawings

METHOD FOR PRODUCING A HIGH-PURITY NANOMETER ZINC OXIDE FROM STEEL PLANT SMOKE AND DUST BY AMMONIA DECARBURIZATION

CROSS REFERENCE OF RELATED APPLICATION

This is a national phase application of an international patent application number PCT/CN2012/081877 with a filing date of Sep. 25, 2012. The contents of these specifications, including any intervening amendments thereto, are incorporated herein by reference.

BACKGROUND OF THE PRESENT INVENTION

Field of Invention

The present invention relates to a method for producing zinc oxide, and more particularly to a method for producing high-purity nanometer zinc oxide.

Description of Related Arts

At present, the smoke and dust from steel plant (including blast furnace grey, converter ash, electric furnace ash), also called smoke and dust storage ash, each producing a ton of steel will produce 35~90 kg of said smoke and dust, said smoke and dust contains iron of 15~30%, silicon oxide of 4~5%, zinc of 5~22%, combustion fixed carbon (C) of 25~55%, calcium oxide of 2~5%, magnesium oxide of 1~2%, and titanium, vanadium and alkali etc. Under normal conditions, said smoke and dust is generally used as sintering raw materials to produce sinter production, it is recycled in steel plant internal, with enrichment of the cycle, the zinc load entering into furnace is more and more high, seriously affect the normal operation of Blast furnace.

Methods currently limit zinc load in blast furnace contain: one is limiting the amount of recycled smoke and dust; two is mineral processing by the smoke and dust; three is adopting pyrometallurgy and hydrometallurgy. The first method is not an economic and effective method for reducing zinc load of blast furnace, and it brings environmental pollution. The second method is enriching the zinc to the tail mud, but in the mud, but the three products of fine iron, fine carbon and tail mud is disorder, iron, carbon resource are still lost. The third method contains pyrometallurgy and hydrometallurgy, the pyrometallurgy is divided into the treatment of direct sintering method, pelletizing treatment method and direct reduction processing method. But zinc, lead and alkali metals have not been solved. The hydrometallurgy is divided into acid method and alkali method, the process of acid method is maturity, the zinc leaching rate is only about 80% if it is no heating, if rising the temperature, the zinc leaching rate is up to 95%, but the iron is as high as 60%, iron removal is difficult, and a waste of iron, serious corrosion of equipment, is not up to the requirements of environmental protection. But the leaching rate of alkali method is lower. The overall characteristic of existing hydrometallurgy leaching zinc is the zinc leaching rate is low, leached residue is difficult to recycle, unable to meet the requirements of environmental protection, serious equipment corrosion, sensitive to the material requirements, difficult optimization for process, production efficiency is low and the steel output does not match. At present, China's iron and steel enterprises dust containing zinc adding sintering recycling mode has on blast furnace, sintering production and steel plant environment brought great harm, treatment of dust is very urgent.

The most ideal processing method for the steel plant smoke and dust is the selective leaching of zinc, it make the zinc entering into the final leached solution, and recycle zinc valuably.

High-purity zinc oxide usually refers to the zinc oxide product with the mass percent ≥99.7%. The high-purity zinc oxide is an indispensable raw material for the modern high technologies, with wide applications. It is mainly used in glass, feed, ceramics, dyes, paint, paper-making, rubber, pesticides, oil refining, galvanization, special steel, alloy, defence-related science and technology, etc. The glass, paper-making, or rubber, oil refining enterprises have high demands for zinc oxide and very high purity requirement.

The current method for producing high-purity zinc oxide, mainly is the indirect method, said indirect method in general adopts zinc ingots as raw material, through the electrolytic reduction, or high temperature air gasification, oxidation and condensation collection to prepare zinc oxide, adopting different raw materials of zinc ingots, the purity of produced zinc oxide is not the same, this process is mainly the production of zinc oxide of 99.5%-99.7%.

Ammonia method is a commonly used method for producing zinc oxide. Currently, the ammonia method (ammonia—ammonium bicarbonate combined leaching method) for producing zinc oxide generally includes the following steps: leaching of zinc-containing materials using ammonia-ammonium bicarbonate as leaching agent, and after purification, ammonia evaporation crystallization, drying, calcinations of zinc-ammine complexing solution, produce the zinc oxide product. In general, the content of zinc oxide is 95-98%.

Above-mentioned traditional ammonia method for producing zinc oxide has not been used in steel plant smoke and dust, mainly due to the following reasons:

1. Those steel plant smoke and dust have low zinc content (in general, Zn %=5–22), the leached solution has low zinc concentration, high consumption of leaching agent and high cost, so enterprises can not afford;
2. Because of complicated impurities, it only can obtain product of general activity zinc oxide, qualified rate of products is low, product prices are low and economic benefit is difference;
3. Conventional means of leaching, leached rate of zinc ore is low, residual zinc in leached residue is high, resource recycle of Iron, carbon has not formed a complete chain, smoke and dust value not use and reflect.

Nanometer zinc oxide (ZnO) is a new type of high-function fine inorganic product with the particle size between 1 and 100 nm in the $21^{st}$ century, exhibiting a variety of special properties such as non-migratory, fluorescence, piezoelectric, absorption and UV scattering ability, etc. With its special optical, electrical, magnetic and sensitivity performance, it can be used to produce gas sensors, phosphors, rheostat, UV shielding materials, image recording materials, piezoelectric materials, varistors, efficient catalysts, magnetic materials, and plastic films, etc.

Currently the methods producing zinc oxide mainly include chemical precipitation method, sol-gel method, microemulsion method and hydrothermal synthesis method, etc. But all raw materials used are zinc calcine or pure zinc salts (such as zinc sulfate, zinc nitrate or zinc acetate) with the zinc content higher than 50%.

Currently, the disclosed technologies of producing nanometer zinc oxide by ammonia leaching method are low-temperature hydrolysis methods, for example:

Chinese Patent Application No. 92103230.7 discloses an improved technology for producing zinc oxide aiming at traditional ammonia complexometry. The purified zinc-ammonia complexing solution is diluted with water to hydrolyze part of zinc-ammonia complexing solution and obtain the basic zinc carbonate (with a ratio of zinc hydroxide and zinc carbonate of 2:1), and then continue to heat until zinc-ammonia complexing solution is decomposed completely. After high-temperature calcinations, 30-100 nn nanometer zinc oxide is obtained.

For the patented technology, the following problems need to be solved:

After hydrolysis, in the thermal decomposition process of undissociated zinc-ammonia complexing solution, the newly generated basic zinc carbonate will continue to grow on the original surface of crystal nucleus, promoting the growing of originally hydrolyzed crystal, which is prone to cause uneven zinc carbonate crystal, making it difficult to control the particle size of the final product.

It adds 4-10 times of water, reducing the efficiency in the preparation process, increasing the energy consumption and the water treatment cost at the back end.

Chinese Patent Application No. 200610130477.7 disclosed an improved technology producing zinc oxide for the traditional ammonia complex method. The zinc-ammonia complexing solution is mixed with 1:2-20 of hot water or hot mother liquor continuously. After heating and heat preservation, it is recycled to be used in hydrolysis of zinc-ammonia complexing solution, to prepare 10-50 nn of nanometer zinc oxide.

For the patented technology, the following problems need to be solved:

After hydrolysis of mother liquor, the ammonia cannot be fully separated, and it cannot achieve the hydrolysis effect, and finally the zinc-ammonia complexing solution is mixed with the zinc-ammonia complexing solution.

For the above two patents, the nanometer crystals are obtained by slightly changing pH value with a large amount of water. In fact, relying solely on the pH value slight change, only a very small part of hydrolysis can be achieved (checked from the ammonium hydroxide solubility curve of zinc oxide). The higher the concentration of zinc ammonia liquid, the higher the precipitation efficiency and lower energy consumption; while the lower concentration of zinc ammonia liquid, the lower the precipitation efficiency and high energy consumption. It is technically feasible by artificially increasing the proportion of water to produce nanometer zinc oxide, but it is not feasible in terms of economic efficiency.

In addition, for the current ammonia leaching method for producing zinc oxide, the crystal is basic zinc carbonate, with high decomposition temperature (the initial temperature of zinc hydroxide decomposition is about 125° C., and that of zinc carbonate is about 300° C.). In order to obtain high-purity products, it is necessary to guarantee a high decomposition temperature, generally controlled at above 500° C., to completely decompose the basic zinc carbonate. For example, in the Chinese Patent with Application No. 200610130477.7, the calcinations temperature is as high as 550° C. High-temperature calcinations seriously affect the specific surface area and dispersity of zinc oxide, and thereby affecting its application field.

In summary, for treatment process of the steel plant smoke and dust, how to effectively leach the zinc from materials with low zinc content and get high-purity nanometer zinc oxide and to overcome the disadvantages of traditional pyrometallurgy and hydrometallurgy have become technical problems urgently to be resolved in the industry.

SUMMARY OF THE INVENTION

An objective of the present invention is to provide an effective method for recycling the zinc from steel plant smoke and dust and producing high-purity nanometer zinc oxide.

In order to achieve the above objectives, the present invention is embodied by the follow technical solution: A method for producing a nanometer zinc oxide from steel plant smoke and dust by ammonia decarburization, comprising the following steps:

The steel plant smoke and dust undergoes leaching, purification for impurity removal, crystallization by ammonia evaporation, drying and calcinations, characterized in that:

Take ammonia water-ammonium bicarbonate solution as a leaching agent in said leaching step, in said ammonia water-ammonium bicarbonate solution, the molar concentration $c(NH_3)$=5.5-7 mol/L, the molar concentration $c(CO_3^{2-})$=0.95-1.2 mol/L, and adding 0.3-0.5 kg sodium fluorosilicate to per cubic meter of said leaching agent, obtain leached solution after leaching;

Control the concentration of zinc oxide of said leached solution to 50-60 g/L, and then perform heating to decarburize, the procedures are: add 30-60 kg slaked lime to per cubic meter of leached solution and stir, heating to 90-98° C., when $c(CO_3^{2-})$<0.3 mol/L, add ammonium persulfate with the amount of 3-4 kg to per cubic meter of aforementioned solution, add slaked lime powder with the amount of 10 kg/m³ additionally, continue stir for decarburization and carrying out oxidation reaction, until the concentration of $CO_3^{2-}$ is $C(CO_3^{2-})$≤0.1 mol/L, perform filter for separation;

Perform refining treatment after purification for impurity removal, the procedure of said refining treatment is: add surfactant to the solution of after purification for impurity removal, the amount of surfactant, such as SDS, is 30-50 g per cubic meter of solution of said after purification for impurity removal, and stir fully.

The procedures for purification for impurity removal, ammonia evaporation crystallization, drying and calcinations adopt the process parameters of common ammonia method for producing zinc oxide.

In the present invention, the existing zinc oxide producing technology is applied to the treatment of steel plant smoke and dust. Meanwhile, under the basis of existing ammonia method, add appropriate amount of sodium fluorosilicate into leaching agent. Add the step of decarburization, after the purification for impurity removal step; add the steps of refining treatment.

In order to obtain high-purity Zinc Oxide, first of all need to ensure zinc in the steel plant smoke and dust can be leached as far as possible, this can increase the recovery of zinc, on the other hand, the content of zinc in the leached solution is more big, the impurity content is smaller, can guarantee the preparation of more higher purity zinc oxide the in same process conditions.

Since the steel plant smoke and dust contains a large amount of iron, which can not be leached out by strong acid, it not only consumes a large amount of acid, but also dissolves out a large amount of iron, it is difficult to purify. The dissolution of zinc ferrite in the acid is also very slow, thus, in the present invention; ammonia method is adopted for leaching. Ultrafine particle in smoke and dust gangue plays an isolating effect for the leaching agent. To resolve this problem, through a lot of experiments, the inventor of the present invention concluded that, appropriate amount of sodium fluorosilicate can get rid of the packing effect of ultrafine particles on the leaching material, to realize the stratification and floating of ultrafine particles, and it makes particles containing zinc is completely immersed in the leaching agent.

By adding the step of decarburization and ammonia reduction, it can on one hand, eliminate the excess of free ammonia, reduce the complexing ability of impurity ion, to remove the impurity ions (Such as high temperature condensed sedimentation for colloid ion such as silicate), enhance the purification quality and reduce the dosage of purified reagents; and on the other hand, it can remove the carbonate ion in the solution, to get the nanometer precursor zinc hydroxide precipitate with a smaller size of crystal nucleus and low decomposition temperature in the subsequent deamination hydrolysis process.

At the same time, through many experiments, the inventor of the present invention concluded that: use slaked lime as decarburization agent, on the one hand it can provide ligand of $OH^-$ to replace the $CO_3^{2-}$, make $CO_3^{2-}$ eliminate by the formation of $CaCO_3$ precipitates, also slightly alkaline environment contributes to the precipitation of metal impurity ion such as iron ion, and create the conditions for the subsequent purification. On the other hand, the lime milk price is low.

Secondly, to get zinc oxide of nanometer scale, it needs to inhibit the growth of crystal particle. The particle size and distribution range of nanometer zinc oxide obtained by the existing ammonia method is unsatisfactory, which mainly contributes to the growing of crystals in the process of treatment, particularly the treatment on the raw material such as steel plant smoke and dust with low content of zinc. To resolve the above problems, through a lot of experiments, the inventor of the present invention concluded that add appropriate amount of surfactant to the solution of being performed Purification for impurity removal, to effectively inhibit the growth of crystal in combination with the high-speed stirring in the process of ammonia precipitation and crystallization.

The chemical reaction equations in the leaching step are as follows:

$$ZnO+nNH_3+H_2O \rightarrow [Zn(NH_3)_n]^{2+}+2OH^-$$

$$ZnFe_2O_4+nNH_3+4H_2O \rightarrow [Zn(NH_3)_n]^{2+}+2Fe(OH)_3\downarrow+2OH^-$$

$$ZnFe_2O_4+nNH_3+H_2O \rightarrow [Zn(NH_3)_n]^{2+}+Fe_2O_3\downarrow+2OH^-$$

$$Zn_2SiO_4+2nNH_3 \rightarrow 2[Zn(NH_3)_n]^{2+}+SiO_4^{4-}$$

$$ZnSiO_3+nNH_3+2NH_4HCO_3 \rightarrow [Zn(NH_3)_n]CO_3+SiO_2.H_2O+(NH_4)_2CO_3$$

Wherein, $n=1\sim4$;

The chemical reactions in the decarburization step are as follows:

$$Ca(OH)_2=Ca^{2+}+2OH^-$$

$$Ca^{2+}+CO_3^{2-} \rightarrow CaCO_3\downarrow$$

$$NH_3.H_2O+NH_4HCO_3 \rightarrow 2NH_3\uparrow+CO_2\uparrow+2H_2O;$$

The reactions in the purificaton to remove impurity step:

$$S_2O_8^{2-}+Mn^{2+}+2NH_3.H_2O+H_2O \rightarrow MnO(OH)_2\downarrow+2NH_4^++2SO_4^{2-}+2H^+$$

$$S_2O_8^{2-}+2Fe^{2+}+6H_2O \rightarrow 2SO_4^{2-}+2Fe(OH)_3\downarrow+6H^+$$

$$AsO_4^{3-}+Fe^{3+} \rightarrow FeAsaO_4\downarrow$$

$$AsO_3^{3-}+S_2O_8^{2-}+H_2O \rightarrow 2SO_4^{2-}-AsO_4^{3-}+2H^+$$

$$2H_3AsO_3+8Fe(OH)_3 \rightarrow (Fe_2O_3)_4As_2O_3.5H_2O\downarrow+10H_2O$$

$M^{2+}+S^{2-} \rightarrow MS\downarrow$ wherein, M represents $Cu^{2+}$, $Pb^{2+}$, $Cd^{2+}$, $Ni^{2+}$, $Hg^{2+}$ and other ions $$As^{3+}+S^{2-} \rightarrow As_2S_3\downarrow$$

$Y^{2+}+Zn \rightarrow Zn^{2+}+Y$, wherein, Y represents $Cu^{2+}$, $Pb^{2+}$, $Cd^{2+}$, $Ni^{2+}$ and other ions;

Reaction equations in the ammonia evaporation step:

$$[Zn(NH_3)_i]^{2+}+2OH^-=Zn(OH)_2\downarrow+iNH_3\uparrow$$

$$[Zn(NH_3)_i]SO_4+2NH_3.H_2O \rightarrow Zn(OH)_2\downarrow+iNH_3\uparrow+(NH_4)_2SO_4 \text{ 其中 } i=1\sim4;$$

Chemical reaction equation in the drying and calcinations step:

$$Zn(OH)_2 \rightarrow ZnO+H_2O\uparrow.$$

Preferably, add surfactant additionally with the amount of 0.05 kg~0.1 kg per cubic meter of said leaching agent, The surfactants can be selected from SDS, etc.

The surfactants can reduce the surface energy, and when combined with sodium fluorosilicate, it can get rid of the coating effect of ultrafine particles, increasing the penetration ability of the leaching agent and enhancing the recovery rate of zinc.

Further, additionally with the amount of 0.5 kg~1 kg per cubic meter of said leaching agent.

Dicyandiamide, as an ammonia stabilizer, can reduce the volatilization of ammonia in the leaching process, improve the working environment of leaching and reduce the loss of ammonia.

Preferably, wet ball-milling leaching is adopted when leach the smoke and dust.

Further, assure that the leaching time in ball mill is 50~60 minutes, the material at ball mill outlet all through 140 mesh sieve.

When wet ball-milling leaching mode is adopted, it can damage crystal structure such as zinc ferrite in smoke and dust (achieve the mechanical activation), combines with chemical activation of surfactant and slaked lime, it can achieves a higher leaching speed and leached rate. Through ball milling mechanical activation and the adding of surfactant (sodium fluorosilicate, SDS etc.), higher leached rate is obtained.

Preferably, after decarburization step, add ammonium fluoride to the solution with the amount of 1.5-2.0 times of the theoretical value of $Ca^{2+}$ in the solution.

Preferably, detect the zinc content of liquid in the ammonia evaporation equipment at any time in the said crystallization by ammonia evaporation step. When the zinc content is 1-1.5%, add NaOH solution to the ammonia evaporation equipment with the adding amount of 3-5L per cubic meter of said ammonia evaporation solution, and the concentration of said NaOH solution is 30% calculating by mass percent. When the mass percent of zinc is lower than 0.3%, the ammonia evaporation step is finished.

In the late stage of ammonia evaporation, when the zinc concentration in the complexing solution is low, add NaOH to increase the pH value of the solution, which can convert $NH_4^+$ to $NH_3$, to achieve the effect of quickly evaporating ammonia and crystallizing, forming nanometer zinc hydroxide crystal nucleus.

Preferably, add sodium stearate solution to the said ammonia evaporation solution with the amount of 3-5L per cubic meter of said ammonia evaporation solution, and the concentration of said sodium stearate solution is 5% calculating by mass percent.

Adding sodium stearate in ammonia evaporation process, it makes the produced nanometer crystalline body closed and package, and makes them no longer continue to grow up.

The second objective of the present invention is to provide a high purity and high performance of high-purity nanometer zinc oxide, the present invention is embodied by the follow technical solution: aid calcinations temperature is 150-280° C.

Due to the technical solution of the invention, after the step of ammonia evaporation for crystallization, it obtains almost all zinc hydroxide, the decomposition temperature of zinc hydroxide is lower than the basic zinc carbonate, calcination with a temperature of 150-280° C., can be obtained zinc oxide product with the purity of more than 99.7% and with large specific surface area, the specific surface area $\geq 108$ m$^2$/g, the dispersion of liquidity, with low temperature calcinations, the fluidity and dispersity both better.

The main innovation points of the present invention are as follows: (1) add the decarburization treatment step, to get rid of excess free $NH_3$ and remove $CO_3^{2-}$ to achieve the purposes of rapid crystallization when ammonia evaporation; (2) In the step of ammonia evaporation, when the ammonia concentration of zinc-ammonia complexing solution is low, add NaOH to increase the PH value of the solution, to realize the rapid ammonia precipitation; (3) add a surfactant (e.g. SDS) to the zinc-ammonia complexing solution, combined with ammonium sulfate in its own solution, to form crystal nucleus coating film and effectively control the growth of the nanometer zinc oxide crystal nucleus; (4) realize high-speed stirring through the steam power, to control the crystal nucleus of nanometer zinc oxide.

In summary, own to adopt the technical solution, the beneficial effect of the present invention are: the ammonia process is used for treating smoke and dust, and the existing ammonia process is adaptively improved, add sodium fluorosilicate, surfactant and dicyandiamide to the leaching agent when leach, on the one hand, the leaching speed and the leaching rate of zinc in the smoke and dust are improved, add decarburization step and add the resistance change agent to inhibit the growth of crystals in the ammonia evaporation process, and obtain the nanometer zinc oxide precursor with small particle size and uniform particle sizes. On the other hand, the present invention adopts lower calcinations temperature; it can obtain zinc oxide with large specific surface area and purity of up to 99.7%, it is of high economic value; in addition, the treatment method of the present invention is characterized by low energy consumption and high efficiency, the leaching agent can be recycled, and thoroughly solves the problem of zinc load of steel plant furnace smoke and dust, thereby meeting the requirement of the steel plant on purification of the harmful components comprising zinc and alkali metals(leached rate of zinc is up to 90%, removal rate of alkali metals is up to 99%), and achieving good production circulation. And recover valuable steel and carbon source of steel plant, it enriches the steel and carbon source, iron content increased from 15-30% to 18-38%, carbon heat increased from the original about 1000-4500 kcal/kg to 1600-5200 kcal/kg; iron and carbon recycling rate reached more than 98%, both to save energy and create a good economic benefit.

DETAILED DESCRIPTION OF THE PREFERRED EMBODIMENT

The present invention is further described in details with the embodiments. One skilled in the art will understand that the embodiment of the present invention as shown in the drawings and described above is exemplary only and not intended to be limiting.

Embodiment 1

Raw material: 1$^\#$ steel plant smoke and dust from Kunming, the ingredients: Zn of 9.7%, Fe of 27.14%, Pb of 0.85% Cd of 0.007% C of 28% alkali metal(k, Na) of 2.9%.

The method for producing high-purity nanometer zinc oxide:

(1) Leaching: take 500 g of said 1$^\#$ smoke and dust, prepare 1500 ml ammonia water-ammonium bicarbonate solution as leaching agent, of which, the concentration of $NH_3$ is 4.5 mol/L and the concentration of $CO_3^{2-}$ is 1.2 mol/L. Add 0.45 g sodium fluorosilicate; perform three-section leaching. The leaching time of each section is 2 hours. After solid-liquid separation, the obtained zinc-ammonium complexing solution contains 43.89 g of zinc (zinc recovery rate is 90.5%);

(2) Decarburization: after leaching step, control zinc oxide of said leached solution to 50 g/L, and then heat for decarburization according to the following procedures: add 60 g of slaked lime to leached solution, heat it 90° C. while stirring.

When the concentration of $CO_3^{2-}=0.3$ mol/L, add 3 g ammonium persulfate and 10 g slaked lime to the above liquid, continue to stir for decarburization and oxidation reaction, until $c(CO_2)=0.1$ mol/L, and then separate it by filtration;

(3) Purification for impurity removal: add 1.32 g of potassium permanganate to liquid of after separation of step (2) and stir for 0.5 hour meanwhile, add a small amount of polyacrylamide solution (4 mg/L),and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add KMnO4 to the filtrate with the amount of 2.7 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter, obtain filtrate;

(4) after purification for impurity removal, perform refining treatment, the method: Add 0.03 g of surfactant SDS to liquid after purification for impurity removal, obtain refining solution;

(5) Ammonia evaporation and crystallization: Take said refining solution into ammonia evaporation equipment, solution temperature is 105° C. Stop ammonia evaporation when $[Zn^{2+}]=1.5$ g/L, perform solid-liquid separation for the obtained emulsion, wash filter cake using water according to the ratio of liquid to solid 5:1, washing time is 1 hour, and then filter to obtain filter cake;

(6) Drying and calcinations: dry the filter cake at 105° C., obtain powder, calcine for 60 minutes in a muffle furnace at 280° C., sample and detect, obtain zinc oxide with the purity ZnO%=99.72%, the average particle diameter of nanometer prepared is 14.7 nm (XRD line width method), specific surface area is 109 m$^2$/g.

Embodiment 2

Raw material: $2^4$ smoke and dust from one steel plant of south, the ingredients: Zn of 6.2%, Fe of 29.6%, Pb of 0.87%, C of 15.24%, Si of 8.7%, alkali metal(k, Na) of 3.47%.

The method for producing high-purity zinc oxide:

(1) Leaching: take 500 g of said $2^4$ smoke and dust, prepare 1500 ml ammonia water-ammonium bicarbonate solution as leaching agent, of which, the concentration of $NH_3$ is 7 mol/L and the concentration of $CO_3^{2-}$ is 0.95 mol/L. Add 0.75 g sodium fluorosilicate, 0.075 g of surfactant SDS and 0.75 g dicyandiamide to ammonia water-ammonium bicarbonate solution; perform ball-milling while leaching, the leaching time in ball mill is 30 minutes, The ball mill outlet material all through 140 mesh sieve, perform three-section leaching by stirring. The leaching time of each section is 2 hours. After solid-liquid separation, the obtained zinc-ammonium complexing solution contains 28.37 g of zinc (zinc recovery rate is 91.5%);

(2) Decarburization: after the pre-evaporation ammonia, control zinc oxide of said leached solution to 60 g/L, and then heat for decarburization according to the following procedures: add 25 g of slaked lime to leached solution, heat it 98° C. while stirring. When the concentration of $CO_3^{2-}$=0.28 mol/L, add 2 g ammonium persulfate and 5 g slaked lime to the above liquid, continue to stir for decarburization and oxidation reaction, until c($CO_2$)=0.09 mol/L, and then separate it by filtration;

(3) Removal of calcium: after finishing the decarburization step, add ammonium fluoride to the solution, the amount of ammonium fluoride is 1.5 times of theoretical value of $Ca^{2+}$ in the solution;

(4) Purification for impurity removal: add 0.85 g of potassium permanganate to the solution of after removal of calcium, and stir for 0.5 hour meanwhile, add a small amount of polyacrylamide solution (4 mg/L),and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add $KMnO_4$ to the filtrate with the amount of 3.5 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(5) after purification for impurity removal, perform refining treatment, the method: Add 0.005 g of surfactant SDS to liquid after purification for impurity removal;

(6) Ammonia evaporation and crystallization: take said refining solution into ammonia evaporation equipment, solution temperature is 108° C. Detect the zinc content in the ammonia evaporation equipment, when the zinc content is 1%, add NaOH solution which mass percent is 30% with the amount of 2.5 mL; stop ammonia evaporation when the mass percent of zinc is lower than 0.3%, obtain emulsion, perform solid-liquid separation for said emulsion, wash filter cake using water according to the ratio of liquid to solid 5:1, washing time is 1 hour, and then filter to obtain filter cake;

(7) Drying and calcinations: dry the filter cake at 105° C., obtain powder, calcine for 60 minutes in a muffle furnace at 200° C., sample and detect, obtain zinc oxide with the purity ZnO%=99.79%, the average particle diameter of nanometer prepared is 23.7 nm (XRD line width method), specific surface area is 115 m$^2$/g.

Embodiment 3

Raw material: $3^\#$ smoke and dust from steel plant of southwest, the ingredients: Zn of 15.4%, Fe of 32.53%, Pb of 0.67%, C of 25.28% alkali metal(k, Na) of 2.52%.

The method for producing high-purity zinc oxide:

(1) Leaching: take 1000 g of said $3^\#$ smoke and dust, prepare 3000 ml ammonia water-ammonium bicarbonate solution as leaching agent, of which, the concentration of $NH_3$ is 5.8 mol/L and the concentration of $CO_3^{2-}$ is 1.15 mol/L. Add 1.2 g sodium fluorosilicate, 0.3 g of surfactant SDS and 3 g dicyandiamide to ammonia water-ammonium bicarbonate solution; perform ball-milling while leaching, the leaching time in ball mill is 45 minutes, The ball mill outlet material all through 140 mesh sieve, perform three-section leaching by stirring. The leaching time of each section is 2 hours. After solid-liquid separation, the obtained zinc-ammonium complexing solution contains 142.45 g of zinc (zinc recovery rate is 92.5%);

(2) Decarburization: after the pre-evaporation ammonia, control zinc oxide of said leached solution to 56 g/L, and then heat for decarburization according to the following procedures: add 174 g of slaked lime to leached solution, heat it 95° C. while stirring. When the concentration of $CO_3^{24}$=0.27 mol/L, add 10.8 g ammonium persulfate and 30 g slaked lime to the above liquid, continue to stir for decarburization and oxidation reaction, until c($CO_2$)=0.085 mol/L, and then separate it by filtration;

(3) Removal of calcium: after finishing the decarburization step, add ammonium fluoride to the solution, the amount of ammonium fluoride is 2.0 times of theoretical value of $Ca^{2+}$ in the solution;

(4) Purification for impurity removal: add 4.3 kg of potassium permanganate and stir for 0.8 hour meanwhile, add a small amount of polyacrylamide solution (4 mg/L),and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add $KMnO_4$ to the filtrate with the amount of 3.5 times of the amount of Fe, the temperature is 80° C., stirring time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(5) after purification for impurity removal, perform refining treatment, the method: Add 0.15 g of surfactant SDS to liquid after purification for impurity removal;

(6) Ammonia evaporation and crystallization: take said refining solution into ammonia evaporation equipment, solution temperature is 108° C. In the process of ammonia evaporation and crystallization, add 9 ml of sodium stearate solution which concentration is 5%. Detect the zinc content in the ammonia evaporation equipment, when the zinc content is 1.5%, add NaOH solution which mass percent is 30% with the amount of 15 mL; stop ammonia evaporation when the mass percent of zinc is lower than 0.3%, obtain emulsion, perform solid-liquid separation for said emulsion, wash filter cake using water according to the ratio of liquid to solid 5:1, washing time is 1 hour, and then filter to obtain filter cake;

(7) Drying and calcinations: dry the filter cake at 105° C., obtain powder, calcine for 80 minutes in a muffle furnace at 250° C., sample and detect, obtain zinc oxide with the purity ZnO%=99.81%, the average particle diameter of nanometer prepared is 13.2nm (XRD line width method), specific surface area is 118 m²/g.

Embodiment 4

Raw material: 4# smoke and dust from steel plant of Kunming, the ingredients: Zn of 9.7%, Fe of 27.14%, Pb of 0.85%, Cd of 0.0075, C of 28% alkali metal(k, Na) of 2.92%.

The method for producing high-purity zinc oxide:

(1) Leaching: take 1000 g of said 4# smoke and dust, prepare 3000 ml ammonia water-ammonium bicarbonate solution as leaching agent, of which, the concentration of $NH_3$ is 6.2 mol/L and the concentration of $CO_3^{2-}$ is 1.0 mol/L. Add 1.35 g sodium fluorosilicate, 0.6 g of surfactant SDS and 2.4 g dicyandiamide to ammonia water-ammonium bicarbonate solution respectively; perform ball-milling while leaching, the leaching time in ball mill is 80 minutes, The ball mill outlet material all through 140 mesh sieve, perform three-section leaching by stirring. The leaching time of each section is 2 hours. After solid-liquid separation, the obtained zinc-ammonium complexing solution contains 90.01 g of zinc (zinc recovery rate is 92.79%);

(2) Decarburization: after the pre-evaporation ammonia, control zinc oxide of said leached solution to 52 g/L, and then heat for decarburization according to the following procedures: add 112 g of slaked lime to leached solution, heat it 96° C. while stirring. When the concentration of $CO_3^{2-}$=0.29 mol/L, add 8 g ammonium persulfate and 20 g slaked lime to the above liquid, continue to stir for decarburization and oxidation reaction, until c($CO_2$)=0.095 mol/L, and then separate it by filtration;

(3) Removal of calcium: after finishing the decarburization step, add ammonium fluoride to the solution, the amount of ammonium fluoride is 1.8 times of theoretical value of $Ca^{2+}$ in the solution;

(4) Purification for impurity removal: add 2.7 kg of potassium permanganate and stir for 0.8 hour meanwhile, add a small amount of polyacrylamide solution (4 mg/L),and then filter, obtain filtrate. Add sodium sulfide to said filtrate with the amount of 1.2 times of the theoretical amount of demanding for precipitation of Cu, Cd, Pb, the temperature is 70° C., stirring time is 2 hour, filter, add $KMnO_4$ to the filtrate with the amount of 3.5 times of the amount of Fe, temperature is 80° C., stiffing time is 1 hour (detection of Fe, Mn until they are qualified), filter, add zinc to the filtrate with the amount of 2.5 times of the theoretical amount for replacing Cu, Cd, Pb, stirring time is 30 min, the temperature is 60° C., filter;

(5) after purification for impurity removal, perform refining treatment, the method: Add 0.08 g of surfactant SDS to liquid after purification for impurity removal;

(6) Ammonia evaporation and crystallization: take said refining solution into ammonia evaporation equipment, solution temperature is 108° C. In the process of ammonia evaporation and crystallization, add 10 ml of sodium stearate solution which concentration is 5%. Detect the zinc content in the ammonia evaporation equipment, when the zinc content is 1.5%, add NaOH solution which mass percent is 30% with the amount of 8 mL; stop ammonia evaporation when the mass percent of zinc is lower than 0.3%, obtain emulsion, perform solid-liquid separation for said emulsion, wash filter cake using water according to the ratio of liquid to solid 5:1, washing time is 1 hour, and then filter to obtain filter cake;

(7) Drying and calcinations: dry the filter cake at 105° C., obtain powder, calcine for 70 minutes in a muffle furnace at 200° C., sample and detect, obtain zinc oxide with the purity ZnO%=99.78%, the average particle diameter of nanometer prepared is 13.8 nm (XRD line width method), specific surface area is 115 m²/g.

What is claimed is:

1. A method for producing a nanometer zinc oxide from steel plant smoke and dust by ammonia decarburization comprising:

the steel plant smoke and dust being processed by leaching, purification for impurity removal, crystallization by ammonia evaporation, drying and calcinations, comprising:

taking ammonia water-ammonium bicarbonate solution as a leaching agent in said leaching step, wherein in said ammonia water-ammonium bicarbonate solution, the molar concentration c($NH_3$)=5.5-7 mol/L and the molar concentration c($CO_3^{2-}$)=0.95-1.2 mol/L, and 0.3-0.5 kg sodium fluorosilicate is added to per cubic meter of said leaching agent;

controlling the concentration of zinc oxide of said leached solution to 50-60 g/L and performing heating to decarburize said leached solution, via the following steps: adding 30-60 kg slaked lime to per cubic meter of said leached solution and stirring said leached solution to produce a stirred solution, heating said stirred solution to 90-98° C., adding ammonium persulfate with the amount of 3-4 kg to per cubic meter of said stirred solution when c($CO_3^{2-}$)≤0.3 mol/L and slaked lime powder with the amount of 10 kg/m³ to produce a treated solution, stirring to decarburize said treated solution which is then subject to an oxidation reaction until the concentration of $CO_3^{2-}$ is c($CO_3^{2-}$)≤0.1 mol/L, and performing filter for separation on said treated solution;

performing refining treatment after purification for impurity removal by adding surfactant to said treated solution after purification, wherein the amount of surfactant is 30-50 g per cubic meter of said treated solution after purification.

2. The method for producing high-purity nanometer zinc oxide according to claim 1, further comprising adding surfactant additionally with the amount of 0.05 kg~0.1 kg per cubic meter of said leaching agent.

3. The method for producing high-purity nanometer zinc oxide according to claim 2, further comprising adding dicyandiamide additionally with the amount of 0.5 kg~1 kg per cubic meter of said leaching agent.

4. The method for producing high-purity nanometer zinc oxide according to claim 1, wherein wet ball-milling leaching is adopted when leaching the smoke and dust.

5. The method for producing high-purity nanometer zinc oxide according to claim 4, further comprising assuring that the leaching time in ball mill is 50~60 minutes, and that the material at the completion of balling mill falls through 140 mesh sieve.

6. The method for producing high-purity nanometer zinc oxide according to claim 1, further comprising after decarburization step, adding ammonium fluoride to the solution with the amount of 1.5-2.0 times of the theoretical value of $Ca^{2+}$ in the solution.

7. The method for producing high-purity nanometer zinc oxide according to claim 1, further comprising detecting the zinc content of liquid in the ammonia evaporation equipment in said crystallization by ammonia evaporation step; and when the zinc content is detected to be 1-1.5%, adding NaOH solution to the ammonia evaporation equipment with the adding amount of 3-5 L per cubic meter of said ammonia evaporation solution, wherein the concentration of said NaOH solution is 30% calculating by mass percent, and, completing the ammonia evaporation step when the mass percent of zinc is lower that 0.3%.

8. The method for producing high-purity nanometer zinc oxide according to claim 7, further comprising adding sodium stearate solution to the said ammonia evaporation solution with the amount of 3-5 L per cubic meter of said ammonia evaporation solution, wherein the concentration of said sodium stearate solution is 5% calculating by mass percent.

9. The method for producing high-purity nanometer zinc oxide according to claim 1, wherein said calcinations temperature is 150-280° C.

* * * * *